March 21, 1933.  W. C. HIERING  1,901,965
BAG FRAME FASTENER
Filed Sept. 11, 1931  2 Sheets-Sheet 1
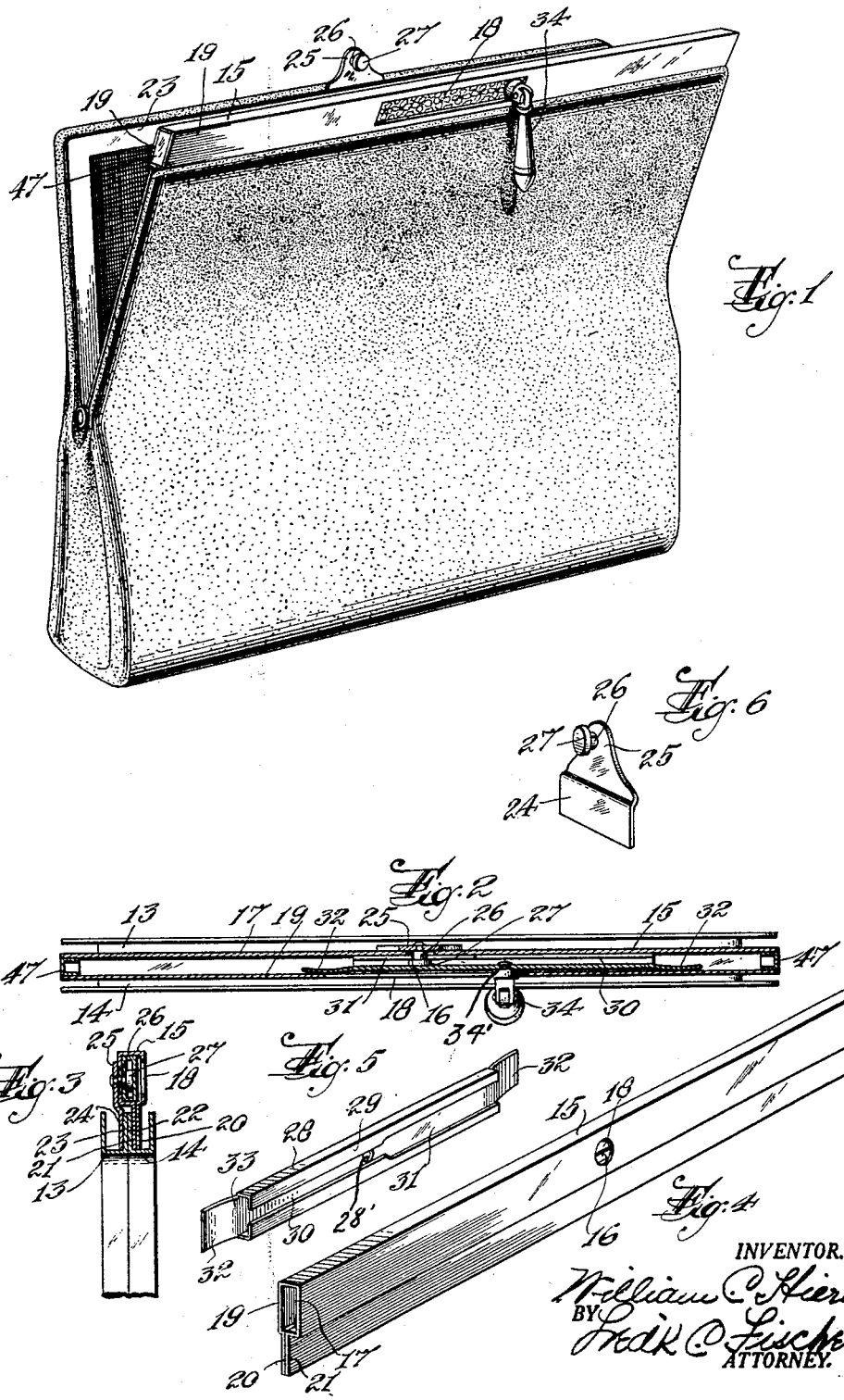

March 21, 1933.　　　W. C. HIERING　　　1,901,965
BAG FRAME FASTENER
Filed Sept. 11, 1931　　　2 Sheets-Sheet 2
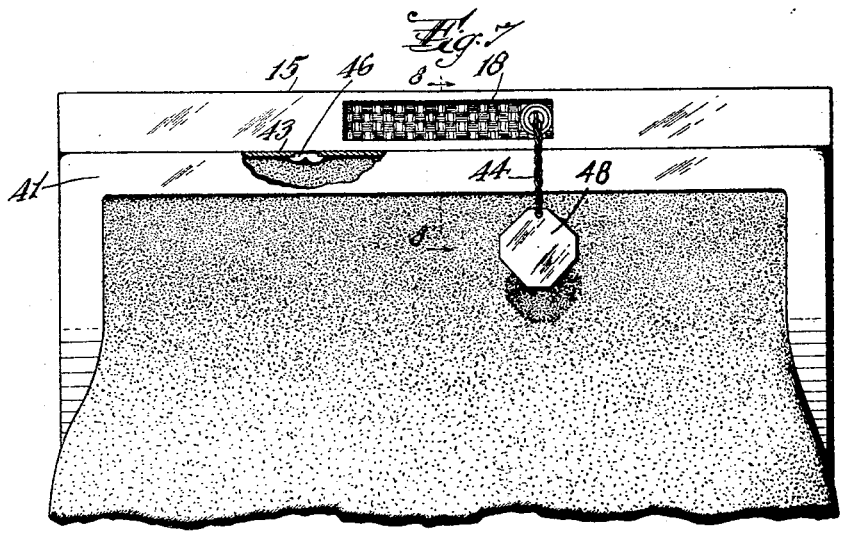
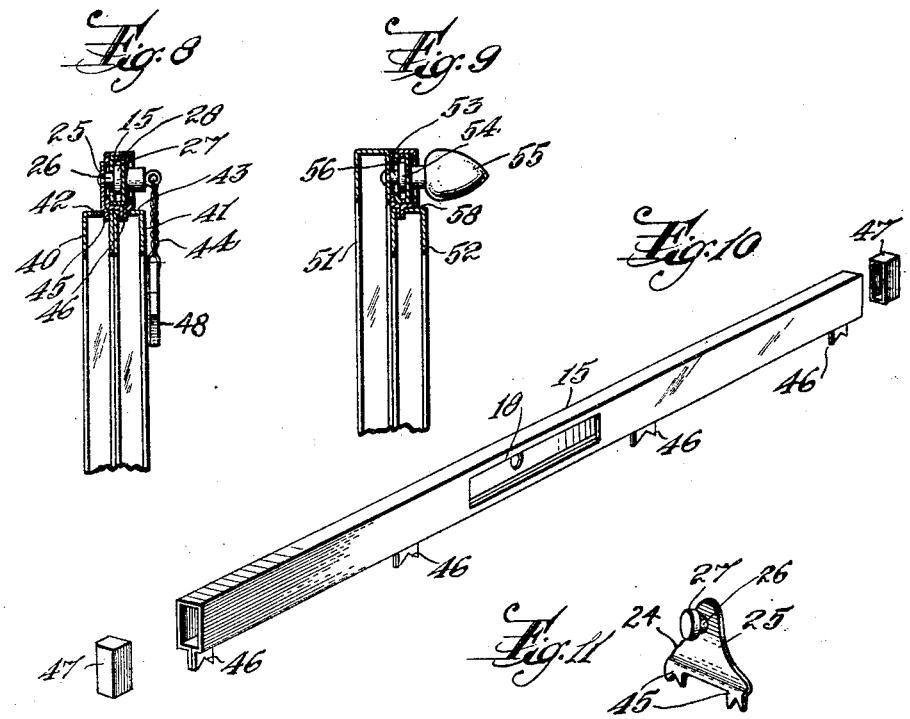
INVENTOR.
William C. Hiering
BY Fredk C. Fischer
ATTORNEY Patented Mar. 21, 1933

1,901,965

UNITED STATES PATENT OFFICE

WILLIAM C. HIERING, OF NEWARK, NEW JERSEY, ASSIGNOR TO J. E. MERGOTT COMPANY, OF NEWARK, NEW JERSEY, A CORPORATION OF DELAWARE

BAG FRAME FASTENER

Application filed September 11, 1931. Serial No. 562,272.

This invention relates to ladies' handbags and more particularly to fastening devices for use on such handbags.

Ladies' handbags are held closed by fasteners usually including a resilient element, the effectiveness of the fastener depending upon the resiliency of the element. Such fasteners are objectionable in that the resilient element is weakened by repeated use, and obviously the effectiveness of the fastener is impaired. Also, the use of a resilient element demands careful assembling, and in many instances, specially designed bag frame members, or special operations have to be employed therewith, which increase the cost of manufacture.

It is an object of this invention to provide a fastening device which may be readily attached to standard bag frame members without material alteration, and which does not depend upon a resilient element for its fastening action.

A further object is the provision of a positive fastening device having few parts, and which will not lose their effectiveness through long and repeated use.

These and other advantageous objects, which will later appear, are accomplished by the simple and practical construction and arrangement of parts hereinafter described and exhibited in the accompanying drawings, forming part hereof, and in which:

Figure 1 is a perspective view of a handbag embodying the invention,

Figure 2 is a horizontal sectional view of the fastening device in a closed position.

Figure 3 is a vertical sectional view of the fastening device in a closed position, Figure 4 is a perspective view of tubular element of the fastening device, Figure 5 is a perspective view of a slidable element of the device, Figure 6 is a perspective view of an element of the fastening device, Figure 7 is a view showing the fastening device applied to inwardly opening channelled frame members, Figure 8 is a sectional view on line 8—8 of Figure 7, Figure 9 is a sectional view of a modification of the device, Figure 10 is a perspective view of a tubular element used in the arrangement shown in Figure 7, and Figure 11 is a perspective view of an element employed in the arrangement shown in Figure 7.

Referring to the drawings, in Figure 1 is shown a handbag having a pair of U-shaped outwardly opening channelled frame members 13, 14, hingedly connected in a well known manner.

Attached to and extending throughout the length of the main body portion of frame member 14 is a tubular casing 15, having an aperture 16 in the side wall 17, and a slot 18 in the side wall 19. The tubular casing 15 is rectangular in cross-section and is preferably formed by bending a sheet of metal to the required shape, the sheet being then bent downwardly to provide a pair of parallel contacting tongues 20, 21 which are secured to each other by suitable means, and tongue 21 is in turn secured by soldering or other suitable means to the inner wall 22 of frame member 14.

Attached to the inner wall 23 of frame member 13 is a small plate 24 having an upper portion 25 from which projects a pin 26 having a flanged head 27, the plate 24 being positioned so that the head 27 will enter the aperture 16 when the frame members 13, 14 are brought together to a position to close a handbag.

The plate 24 is bent laterally at the upper edge of the side wall 23 so that the upper portion 25 of the plate is positioned vertically above substantially the longitudinal center of the frame member 13.

Likewise the tubular casing 15 is formed, relative to the tongues 20, 21 so that the side wall 17 is positioned vertically above the longitudinal center of frame member 14.

Slidably mounted in tubular casing 15 is a member 28 rectangular in cross-section, having its wall 29 provided with a slot 30 having a width less than the diameter of the flanged head 27, which slot 30 opens into a larger slot 31 of width greater than the diameter of the head 27. The opposite wall 33 of member 28 has extensions 32 which are bent slightly to frictionally hold the member 28 in fixed positions. A pendant 34 is secured to the member 28 by means of a stud pin 34' which passes through the slot 18 in the casing 15, and through an aperture 28' in the member 28, the head of the stud pin 34' being upset to rigidly secure the pendant 34 to the member 28 to provide means for sliding the member 28 in the casing 15.

In operation, to fasten the frame members together, they are brought to a position as shown in Figure 2, to enable the head 27 to pass through aperture 16 and enter the large slot 31 in member 28. The flange of head 27 passes beyond the wall 29 of member 28, and the member is then moved longitudinally by means of the pendant 34 to cause the pin 26 to enter slot 30, which has a width less than the diameter of the head 27, the latter engaging the inner surface of wall 29 and withdrawal of the head is thus prevented. To unfasten the frame members the member 28 is moved to place the head 27 in slot 31 from which it may be readily withdrawn.

In Figures 7, 8, the fastening device is shown applied to a pair of inwardly opening channelled frame members 40, 41. The top 43 of frame member 41 has a plurality of slots through which pass the tangs 46 projecting from the bottom of tubular casing 15, the tangs 46, being bent over to securely hold the casing 15 on the frame member. Likewise, the top 42 of frame member 40 has slots to receive tangs 45 integral with plate 24, the tangs being bent over to hold the plate in position. Except for the manner in which the members 25 and 15 are secured to the frame members, the operation of the fastening device is the same. In some instances it is desirable to attach a chain 44 to the slidable member 28 to move the latter, the chain being ornamented by a finger piece 48.

In Figure 9 is shown a modified form of the fastening device in which a pair of inwardly opening channelled U-shaped frame members 51, 52 are used, the frame member 51 having longer hinge members than the member 52 so that the body portion of member 51 is positioned above the body portion of member 52. Attached to the inner side wall 56 of member 51 is a pin 53 having a flanged head 54, corresponding to the head 27 previously described.

A casing 15 is attached to the top 58 of member 52 by tangs 46, and the slidable member 28 in the casing 15 has attached thereto a knob 55 instead of a pendant. The operation of the fastener is similar to that above described. The tubular casing 15 has its ends closed by small caps 47 which are forced therein.

From the above description it will be seen that I have provided a simple and attractive fastening device which may be easily attached to standard shaped frame members. The latch is positive in action and is not dependent upon resilient members which lose their resiliency after repeated use. The parts are rugged and durable; and the device may be ornamented in countless ways. For example, the casing 15 may be plated with one metal, such as gold, and the portion of the slidable member 28 exposed through the slot 18 may be plated with another metal such as silver; or the casing and slidable member may be of the same metal with the portion of member 28 showing through slot 18 ornamented in various manners.

The foregoing disclosure is to be regarded as descriptive and illustrative only, and not as restrictive or limitative of the invention, of which obviously an embodiment may be constructed including many modifications without departing from the general scope herein indicated and denoted in the appended claims.

Having thus described my invention, what I claim as new and desire to secure by Letters Patent is:

1. In combination with a pair of U-shaped frame members, a fastening device, comprising a tubular, rectangular casing attached to one of the frame members, said casing having an aperture in one side and a longitudinal slot in the opposite side, a plate attached to the other frame member, a flanged head projecting from the plate and positioned to enter the aperture when the frame members are brought together, a member slidably mounted in the casing, said member having a side wall provided with a slot having a portion of less width than the diameter of the head and a portion of greater width, and a means projecting through the slot in the casing and attached to the slidable member to move the latter.

2. A bag fastening device, comprising a tubular, rectangular casing having an aperture in one side thereof and a slot in the opposite side, a plate having a flanged head projecting therefrom, said head being positioned to enter the aperture when the plate is in engagement with the casing, a rectangular member slidably mounted in the casing, said member having a side wall provided with a slot with a portion of less width than the head and a portion of greater width, and means projecting through the slot in the casing to move the slidable member.

3. In combination with a pair of hingedly connected bag frame members, a fastening device, comprising a flange head attached to one of the frame members, a tubular rectangular casing having an aperture therein to receive the head, a rectangular member slidably mounted in the casing having means thereon to prevent movement of the head transversely to the members, and means to move the slidable member in the casing.

4. A bag fastening device, comprising a rectangular casing having an aperture therein, a plate having a pin with a head projecting therefrom, said head being positioned to enter the aperture when the plate and casing are in engagement a slidable rectangular member in the casing having means to engage the head and prevent its withdrawal from the casing through the aperture, and means to slide the member to a position to release the head so that it may be withdrawn.

This specification signed this ninth day of September, 1931.

WILLIAM C. HIERING.